Patented Nov. 24, 1953

2,660,215

UNITED STATES PATENT OFFICE 2,660,215

ELECTRICAL INSULATING MATERIAL

Nicholas F. Arone, Upper Darby, Pa., assignor to General Electric Company, a corporation of New York No Drawing. Application September 22, 1950, Serial No. 186,306

7 Claims. (Cl. 154—2.6)

This invention relates to electrical insulation and the production thereof. More particularly, the invention relates to electrical insulating material which is characterized by good mechanical and electrical properties, which is heat- and flame-resistant and is not affected by moisture.

It has been known heretofore to make electrical insulating materials of molded resins, such as phenol-formaldehyde resins and the like or of paper or of other laminae or fillers impregnated with resins. While such materials have generally good electrical characteristics they char and burn excessively when heated to elevated temperatures or exposed to arcs or flame. It has also been suggested that various flame or fireproofing resins or agents be added to the above materials to reduce their heat resistance. The addition of such flameproof media has had the result of detracting from the electrical characteristics and at the same time has been still not productive of insulating materials which will withstand high temperatures or flames.

The costs of prior art materials are also relatively high because of their use of expensive materials such as asbestos and the like.

It is an object of the present invention to provide low cost, easily prepared and mechanically strong electrical insulation which possesses desirable electrical characteristics and at the same time is heat- and flame-resistant.

Other objects will become apparent and the invention better understood from a consideration of the following description.

As a consequence of my invention electrical insulation material having desirable mechanical and electrical properties as well as the ability almost immediately to extinguish after being subjected to elevated temperatures or flame may be produced very cheaply and readily. In accordance with my invention such insulating material may be produced by treating a fibrous base material, such as paper or other cellulosic material, first with a water glass solution, then with a boric acid solution, and then impregnating with melamine formaldehyde resin and curing under heat and pressure to the desired shape.

Specifically, it has been found that electrical insulation material may be produced by first treating the paper or cellulose material with a solution of sodium silicate or water glass at room temperature, then with a saturated solution of boric acid at from 80° C. to 100° C., impregnating with an aqueous solution of melamine formaldehyde resin, drying and molding under heat and pressure.

Any commercial water glass or sodium silicate solution may be used in treating the cellulosic material. Usually, commercially available water glass solution is diluted with water to produce a solution of such viscosity that it will easily penetrate the material to be treated. One such commercial water glass used is that having a specific gravity of 1.38 or 40.6° Bé., an 8.7% Na$_2$O content and a 28.40% SiO$_2$ content for a ratio of 1 part by weight Na$_2$O to about 3.3 parts by weight of SiO$_2$. This solution in actual use is diluted with from 5 to 12 parts by weight of water for every part by weight of water glass and preferably with 10 parts of water to produce the desired penetration. In general, the silica content of the concentrated water glass solution should be not less than about twice that of the Na$_2$O content. While higher silica contents are acceptable, lower silica content solutions have a relatively higher Na$_2$O content which detracts from the electrical characteristics of the finished product.

The boric acid solution is used at a temperature of from 80° C. to 100° C. and the boric acid content is so adjusted as to give a saturated solution at these particular temperatures. At 80° C. the boric acid content of the saturated solution is about 19% by weight, while at 100° C. it is about 27.3% by weight. The 80° C. saturated solution has been found to produce optimum results and is preferred.

The melamine formaldehyde resin used is of the thermosetting type and is water soluble. A 40% to 60% by weight solution of the resin in water at room temperature has been found very suitable for the present purpose while a 50% by weight solution is the preferred specific composition. Such resin having a wide range of molecular weight may be used for the present purposes. However, it is preferred to employ a resin having a molecular weight of about 400 to 500 with the particular aqueous solution mentioned above. It will be understood, of course, that higher or lower molecular weight resins may be used by adjusting the water content of the treating solution.

This invention is directed particularly to the production of heat- and flame-resistant electrical insulation from such inexpensive materials as paper, cotton cloth, exploded cellulose, alpha cellulose and fibrous cellulosic material in general. It will be understood, of course, that other materials which are in and of themselves not fireproof may be likewise treated according to this invention. It will also be understood that while the following illustrations, exemplary of the present invention, are directed to the use of paper as the base material, fibrous materials, in general, in sheet form, loose or agglomerated, are useful in the present role, including exploded fibers.

Laminated insulation of the present type may readily be fabricated by first passing paper through a sodium silicate or water glass solution, as described above, at room temperature. The paper then is passed immediately into a saturated solution of boric acid at 80° to 100° C., preferably 80° C. The paper, thus successively treated with sodium silicate and boric acid solutions, is now passed immediately into the resin impregnating solution. The rate of travel of the base material through the various treating solutions varies from ten to about 30 feet per minute. The melamine formaldehyde water solution, as pointed out above, may contain from 40 to 60% by weight of resin; preferably the resin content is about 50% and the solution is used at room temperature. After resin impregnation, the paper is dried, preferably in air, although oven drying at temperatures not exceeding 110° C. may be utilized to speed the process. Sheets of the treated paper are arranged in superimposed fashion to form a stack of the desired thickness and cured under pressure and heat. In general, a pressure of about 1000 lbs. per sq. in. is adequate to form the laminae or loose fibrous material into consolidated sheets of suitable density. Heat may be applied during the pressing stage for about one-half to one hour at about 100° C. to 140° C. Alternatively, the material may first be pressed and then heat-treated for about one hour at from 120° C. to 140° C. For example, heat and pressure compacted plates one-half inch thick comprising paper laminae 0.0004" thick requires a cure time of one-half hour at 130° C. under 1000 lbs. per sq. in. pressure. The curing time may be varied according to the particular temperature used. It may also be varied to obtain specific desired electrical and chemical and mechanical characteristics. Other cellulosic material such as loose fibers are treated by the same process.

The completed pressed and cured material made by using the preferred treating solution of one part by weight of water glass to ten parts by weight of water, a saturated boric acid solution at 80° C. and a fifty per cent by weight melamine formaldehyde solution, has a by-weight content of fifty-three per cent of the melamine resin, thirty-five per cent paper and twelve per cent of a water glass-boric acid reaction product or sodium borosilicate.

The preferred range of final compositions made by varying the starting constituents as taught above is, by weight, fifty to fifty-five per cent melamine formaldehyde resin, thirty-two to forty per cent paper or fibrous material and ten to thirteen per cent sodium borosilicate. The broad range of final compositions which constitute laminates having the present desirable characteristics is, by weight, forty to sixty per cent melamine resin, twenty-eight to forty-five per cent paper or fibrous material and five to twelve per cent sodium borosilicate.

Electrical insulation prepared according to the present invention has characteristics which are new and unexpected, being not the cumulative result of the various treatments each considered alone, but a new result uncontemplated by the separate use of any one or combination of the present materials other than that specified herein. For example, when using sodium silicate alone as a fire-retardant for paper insulating materials, the addition of enough sodium silicate to render the material fireproof also makes it so brittle as to be useless as a laminate base. The use of boric acid alone does not give the material proper flame-retardant properties; neither does a melamine formaldehyde resin alone impart such properties that flaming caused by a high current arc is extinguished almost immediately. Neither do the combinations of any two of the present treating materials produce the present desirable results which are obtained only by using all three materials in the proportions described.

If too great a concentration of sodium silicate is employed in the present invention, the electrical characteristics and the moldability of the final product are poor; too little sodium silicate lessens the inflammable character of the material. The use of too much boric acid produces a powdery deposit which detracts from the cohering qualities of the material while too little reduces the inflammability. In general, the use of too much sodium silicate or boric acid also raises the power factor and lowers the dielectric strength.

Concentrations of the melamine formaldehyde in the impregnating solution in excess of about 60% by weight are so viscous as to make difficult the thorough impregnation of the paper filler or other cellulose base material. Concentrations less than about 40% do not provide enough polymerizable fluid to give a properly bonded cured material.

Material prepared according to the present invention is mechanically strong. The rupture strength for a laminated material one-half inch in thickness is about 16,000 lbs. per sq. in., while the tensile strength is about 8000 lbs. per sq. The lengthwise impact strength is about 1.600 ft.-lbs. (Charpy) while the compressive strength on the face of the material is over 48,000 lbs. per sq. in.

The water absorption of the present material is very low and the power factor remains practically unchanged for long periods of time in a 100% relative humidity atmosphere ranging over 200 hours.

The electrical characteristics are also very desirable. The dielectric constant is less than 5; the dielectric strength is from 600 to 900 volts per mil at room temperature in oil, and from 400 to 500 volts per mil in oil at 100° C. When subjected to a 250 ampere, 600 volt arc for 10 seconds, all signs of flaming, burning or smoldering cease at once upon removal of the arc. The electrical characteristics of typical laminates made by the present invention as compared to other insulating materials are shown below. In all cases the laminating base used was kraft paper .004" thick.

| Treating Materials | Power Factor 60 | Dielectric Constant | Breakdown Strength Volts/Mil in Oil at Room Temperature | Seconds for Burning to Cease after 250 amp., 600 volt arcing for 10 seconds | Power Factor Change with Exposure to 100% Humidity |
|---|---|---|---|---|---|
| 50% Melamine Formaldehyde-water solution | 1.3 | 2.8 | 69.5 | Burned up to 25 seconds. | Slight increase. |
| Phenol-Formaldehyde resin | 19.3 | 4.3 | 89.1 | ____do____ | Increased substantially. |
| Water glass-water (1 to 8) boric acid (saturated solution at 80° C.) 50% melamine formaldehyde solution. | 1.1 | 2.54 | 781. | Less than one second. | Slight increase. |
| Water glass-water (1-10) boric acid (saturated solution at 80° C.) 50% melamine Formaldehyde solution. | 1.2 | 3.7 | 835. | ____do____ | No change. |
| Water glass-water (1-6) boric acid (saturated solution at 80° C.) 50% melamine formaldehyde solution. | 1.68 | 2.8 | 500. | ____do____ | Slight increase. |

When the above materials were tested according to ASTM Designation: D 635-44, "Standard Method of Test for Flammability of Plastics over 0.050 Inch in Thickness" no evidence whatsoever of burning or smoldering was present upon removal of the external flame. Only under the much more vigorous test conditions described above was any combustion evident and then to a small degree only.

What I claim as new and desire to secure by Letters Patent of the United States is:

1. Electrical heat and pressure compacted insulation consisting by weight of 28 to 45 per cent of a fibrous material, 5 to 12 per cent of sodium borosilicate and 40 to 60 per cent of melamine formaldehyde resin.

2. Electrical insulation comprising heat and pressure compacted laminations of ingredients consisting, by weight, of 28 to 45 per cent cellulosic material, 40 per cent to 60 per cent melamine formaldehyde resin and 5 per cent to 12 per cent of sodium borosilicate.

3. Electrical insulation comprising consolidated laminations which are constituted, by weight, from 28 per cent to 45 per cent paper, 40 per cent to 60 per cent melamine formaldehyde resin and 5 per cent to 12 per cent sodium borosilicate.

4. Electrical insulation consisting of consolidated laminations of from 32 per cent to 40 per cent fibrous base impregnated with, by weight, from 50 per cent to 55 per cent melamine formaldehyde resin and 10 per cent to 13 per cent sodium borosilicate.

5. Electrical insulation consisting of heat and pressure consolidated laminations constituted, by weight, from 32 per cent to 40 per cent paper, from 50 per cent to 55 per cent melamine formaldehyde resin and 10 per cent to 13 per cent sodium borosilicate.

6. Electrical laminated insulation consisting, by weight, of 35% fibrous base, 53 per cent of melamine formaldehyde resin and 12 per cent sodium borosilicate.

7. Electrical heat and pressure consolidated insulation consisting, by weight, of 35 per cent paper, 53 per cent melamine formaldehyde resin and 12 per cent sodium borosilicate.

NICHOLAS F. ARONE.

References Cited in the file of this patent

UNITED STATES PATENTS

| Number | Name | Date |
|---|---|---|
| 2,325,302 | Britt | July 27, 1943 |
| 2,349,698 | Boller et al. | May 23, 1944 |
| 2,405,978 | Pickles | Aug. 20, 1946 |
| 2,439,929 | Hill et al. | Apr. 20, 1948 |
| 2,451,410 | Queeny | Oct. 12, 1948 |
| 2,514,689 | Woodward | July 11, 1950 |
| 2,517,698 | Muskat | Aug. 8, 1950 |
| 2,527,329 | Powers et al. | Oct. 24, 1950 |
| 2,541,927 | Kropa | Feb. 13, 1951 |